Figure 1:
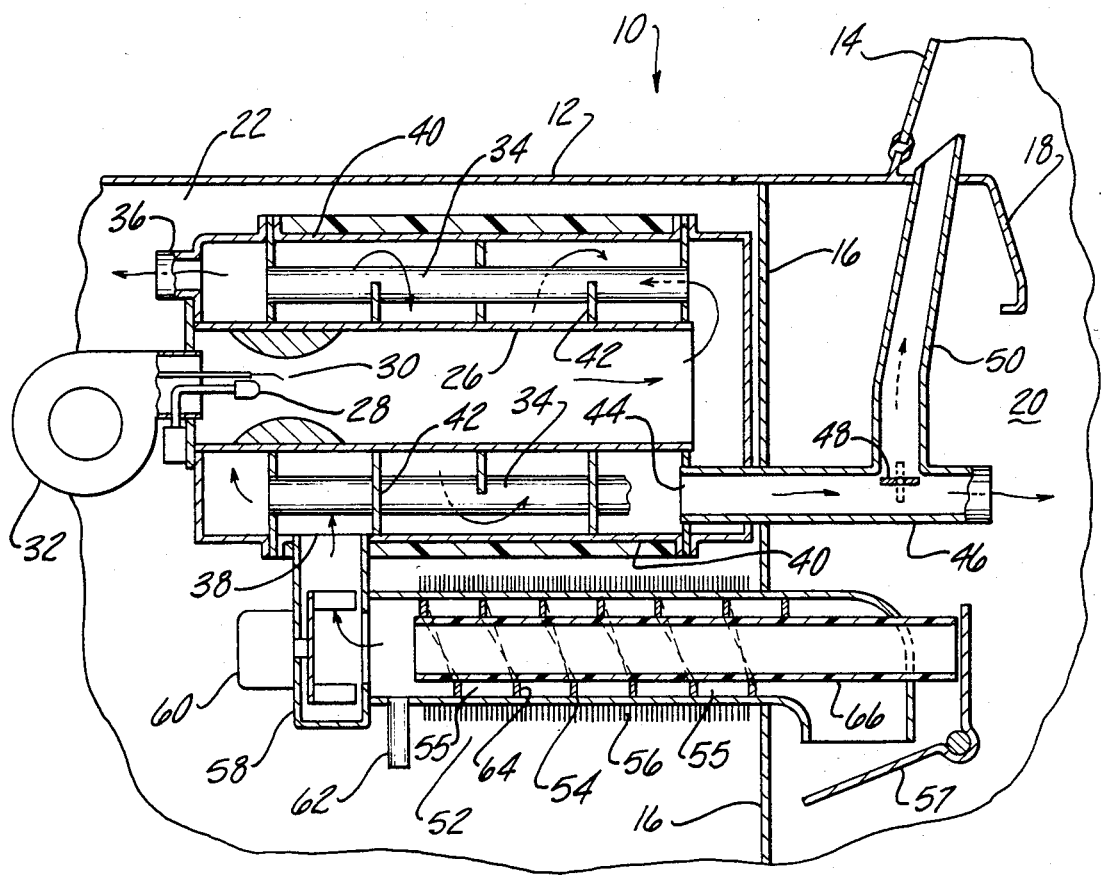

United States Patent [19]
Modzinski et al.

[11] Patent Number: 4,501,390
[45] Date of Patent: Feb. 26, 1985

[54] VEHICLE INTERIOR DEICING/DEFOGGING SYSTEM

[75] Inventors: Charles J. Modzinski, Macomb, Mich.; Michael J. Devaney, Boone County, Mo.

[73] Assignee: The United States of America as represented by the Secretary of the Army, Washington, D.C.

[21] Appl. No.: 449,947

[22] Filed: Dec. 15, 1982

[51] Int. Cl.³ .............................................. B60H 1/02
[52] U.S. Cl. ............................. 237/12.3 C; 98/2.06; 126/110 B
[58] Field of Search ................... 237/12.3 C, 12.3 A; 126/110 B, 110 A; 98/2.05, 2.06, 2.07

[56] References Cited

U.S. PATENT DOCUMENTS

| | | | |
|---|---|---|---|
| 3,942,719 | 3/1976 | Blomberg | 237/12.3 C |
| 4,348,818 | 9/1982 | Brown | 34/77 |

*Primary Examiner*—Henry Bennett
*Attorney, Agent, or Firm*—Peter A. Taucher; John E. McRae; Robert P. Gibson

[57] ABSTRACT

In an arctic vehicle having a heater for the passenger compartment, it is proposed to add an external heat exchanger to remove (condense) moisture from air flowing through the heater. The relatively dry air discharged from the heater into the passenger compartment is less likely to produce fogging or icing on interior surfaces of the vehicle windows. Eliminating or minimizing the fogging-icing condition improves passenger visibility. The invention has special application to military vehicles.

3 Claims, 2 Drawing Figures

VEHICLE INTERIOR DEICING/DEFOGGING SYSTEM

GOVERNMENT INTEREST

The invention described herein may be manufactured, used, and licensed by or for the Government for governmental purposes without payment to us of any royalty thereon.

SUMMARY OF THE INVENTION

This invention relates to means for heating personnel compartments in vehicles subjected to arctic temperatures, e.g. between 0° F. and minus 60° F. The invention is especially applicable to military trucks, e.g. standard 2½ ton and 5 ton trucks.

Under conventional practice arctic military vehicles are equipped with oil-fired heaters for heating the personnel compartments (cabs). Usually the heater is located in the engine compartment near the firewall; an air duct extends from the heater through the firewall to deliver heated air to the personnel compartment. In a slightly different arrangement the heater is located within the personnel compartment behind the vehicle seat. With either of these heater arrangements there is a windshield fogging-icing problem that the heater cannot overcome; under very cold arctic temperatures the interior surfaces of the windshield and other window areas tend to become coated with fog or frost that poses a visibility problem. We believe this problem results from moisture condensing out of relatively warm vehicle interior air as it contacts the cold glass surface. Conventional defrosters only partially alleviate the problem on the windshield; defrosters are ineffective to prevent fogging on the side windows. In some cases the fogging condition is sufficiently severe as to form very heavy frost or ice on the glass interior surface.

Our invention is intended to eliminate or minimize interior icing or frosting of windshields and other optical window surfaces of combat vehicles when operated in arctic temperatures, e.g., down to about −65° F. The theory of the invention is to reduce the humidity of the interior air and thus eliminate the source of the fogging.

It should be noted that considerable moisture may be generated within the vehicle interior, due to human breathing processes. This moisture, when added to the general moisture content of the relatively warm interior air, can cause sweating or frosting on glass interior surfaces; an additional undesired side effect is the possibility of clothing becoming damp, thus posing a health problem. The principal objection is a fog-up or icing condition on the windshield or side windows that creates a visibility problem. Under the standard defroster approach no attempt is made to remove moisture from the cab interior air. The standard conventional approach is to merely heat air and then direct the heated air onto the windshield. The moisture in the heated air can condense on relatively cold surfaces, such as the windshield or side windows.

Our invention employs passive heat transfer outside the cab to chill the air and thereby remove excess humidity. The amount of dehumidification can be manually or automatically regulated to suit personnel comfort and visibility requirements. Preferably the passive heat transfer device is disposed in the engine compartment directly beneath the air heater. Air from the personnel compartment is passed through the heat transfer device on its way to the heater; the relatively cold arctic air on the external surfaces of the heat transfer device chills the air flowing toward the heater, causing moisture to be condensed out of the airstream. The heated air delivered back to the personnel compartment has a relatively low moisture content so that fogging-icing action on the interior surfaces of the window areas is minimized.

THE DRAWINGS

FIG. 1 schematically illustrates one embodiment of our invention.

Figure 2:
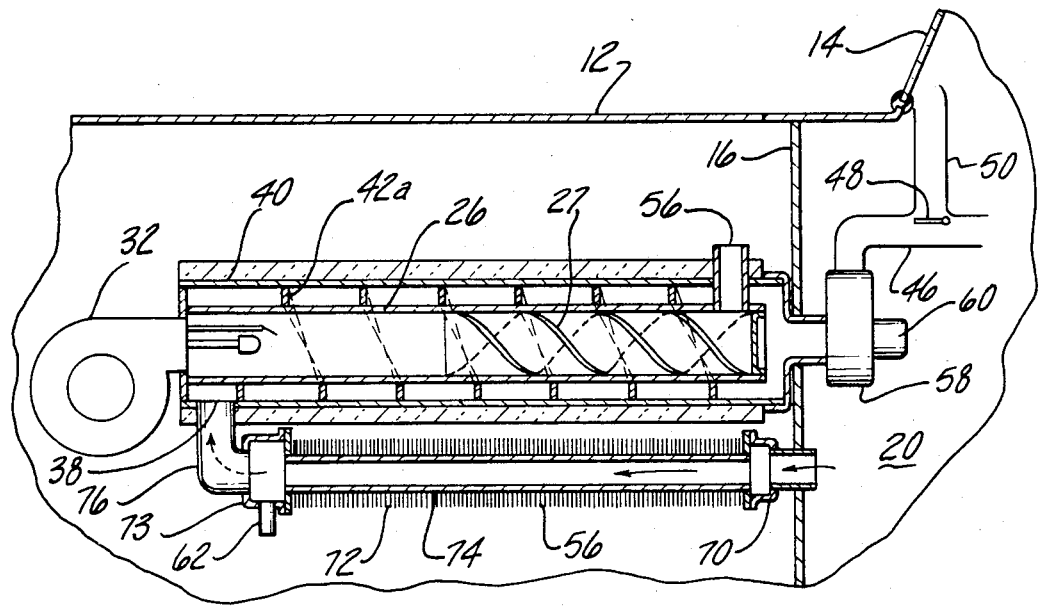

FIG. 2 schematically illustrates a second embodiment of the invention.

Referring in greater detail to FIG. 1, there is fragmentarily shown a military truck 10 that includes a hood 12, front windshield 14, firewall 16, and dashboard 18. The space 20 to the right of wall 16 constitutes a personnel compartment; the space 22 to the left of wall 16 constitutes an engine compartment.

The personnel compartment is heated by a conventional oil-fired heater 24 that may include a cylindrical combustion tube 26 having a fuel-discharge nozzle 28 and igniter electrode means 30 therein. Combustion air is supplied by a blower 32. Flames generated in tube 26 produce hot combustion products that are exhausted from the heater through several small diameter tubes 34 and flue pipe 36. The drawing shows two tubes 34, but in practice there would be a greater number of such tubes arranged around central combustion tube 26.

Relatively cold air from passenger compartment 20 is admitted to the space surrounding tubes 26 and 34 via a cold air inlet 38 in heater outer wall 40. Baffle plates 42 cause the air to take a generally sinuous path as it moves over and along tubes 26 and 34 toward an air outlet 44 defined by duct 46. A manually-controlled valve 48 selectively directs the heated air horizontally through duct 46 to a lower zone in compartment 20 or upwardly through a windshield defrost duct 50.

The described fuel-fired heater and duct system is generally conventional. Our invention relates to an add-on passive heat transfer system located in the engine compartment to chill the air supply for the heater. The chilling action removes excess humidity from the supply air, whereby the heated air discharged from the heater through ducts 46 and 50 has a relatively low moisture content. The heated dry air has a reduced capability for fogging or icing interior surfaces of the windshield and side windows under sub-zero arctic temperatures.

The add-on passive heat transfer system comprises a heat exchanger 52 that includes a horizontal cylindrical tube 54 equipped with external heat transfer fins 56. The right end of the tube communicates with passenger compartment 20; a selector valve 57 controls air flow through the tube. The left end of tube 54 communicates with a centrifugal blower 58, whose discharge opening is located at the heater air inlet 38. Tube 54 has a bypass duct 66 extending therethrough so that air entering the right end of tube 54 flows into an annular passage 55 defined by the inner surface of tube 54 and the outer surface of duct 66.

When valve 57 is in its illustrated position and blower motor 60 is electrically energized the blower causes air to flow leftwardly through passage 55, thence through the heater serpentine path defined by baffles 42, and rightwardly through duct 46 back to personnel compartment 20. When valve 48 is adjusted to its dashed line position at least some of the heated air is directed upwardly through windshield defroster duct 50. While the air is flowing leftwardly through passage 55 it is subjected to a chilling action by the external arctic atmosphere. Moisture is condensed out of the airstream flowing within passage 55. A downwardly-directed tube 62 at the downstream end of heat exchanger tube 54 discharges condensate out of the system.

To increase the residence time of the air within passage 55 it may be desirable to provide a helical baffle wall 65 in the annular passage. Small port openings, not shown, may be provided in baffle 64 near the bottom wall area of tube 54 to facilitate condensate flow toward tube 62.

Duct 66 is preferably formed of a material having thermal insulating properties. The duct is normally closed to air flow therethrough by the aforementioned valve 57. However, should it be desired to do without the air-chilling effect of tube 54 valve 57 can be turned clockwise to open duct 66 and simultaneously close tube 54. Blower 58 then draws air through duct 66. Because the duct is formed of insulating material and because the duct is isolated from heat transfer fins 56 the air is subjected to a reduced chilling action. Duct 66 would be opened to air flow when the ambient temperature is so high that interior frosting of the window surfaces is not a problem, or when it is desired to achieve a quick warm-up of the personnel compartment by the heater. Valve 57 can be manually operated or automatically operated, either by thermostatic means or by humidostatic means.

FIG. 2 illustrates a second form of the invention wherein blower 58 is located in personnel compartment 20 instead of the engine compartment. The heater comprises a combustion tube 26 connected to a flue pipe 36; a helically twisted turbulator 27 is provided in the combustion tube. The air side of the heater includes a helical baffle 42a for causing the air to take a helical path as it moves from left to right along the outer surface of combustion tube 26. Blower 58 provides the force for moving the air through the heater.

The passive heat transfer system comprises a heat exchanger 72 that includes an air inlet header 70 communicating with personnel compartment 20, an air outlet header 73, and a number of horizontal heat transfer tubes 74 extending therebetween. The tubes are oriented in a single horizontal plane so that only one tube 74 is visible in the drawing. Heat transfer fins 56 are wound or pressed onto the tube 74 outer surfaces. The downstream header 73 is connected to the heater air inlet 38 by a short duct 76.

The FIG. 2 system lacks the air bypass feature provided by duct 66 of the FIG. 1 system. However, the FIG. 2 system includes a plurality of tubes 74, as opposed to the single tube 54 provided in the FIG. 1 system; for a given size system the FIG. 2 arrangement provides greater air-chilling heat transfer surface area.

Each system is designed to occupy a relatively small volume in the engine compartment. The heater may be a conventional fuel-fired heater already used in military vehicles when operating in arctic atmospheres. Our invention involves the addition of the passive air-chilling structures 52 or 72 that operate to condense moisture out of the air stream supplied to the heater. System operation provides heating, dehumidification and recirculation of the compartment 20 air; principal aim of our invention is to minimize fogging and frosting on the vehicle window interior surfaces. To provide as compact a system as possible each air-chilling heat exchanger 52 or 72 is constructed as a horizontal tube exchanger located substantially directly below the air heater. Each heat exchanger is in a prone position extending generally parallel to the cylindrical heater. Components are sized to fit within available space in the engine compartment.

We wish it to be understood that we do not desire to be limited to the exact details of construction shown and described for obvious modifications will occur to a person skilled in the art, without departing from the spirit and scope of the appended claims.

We claim:

1. In an arctic vehicle that includes an engine compartment, a personnel compartment having terrain viewing windows, a fuel-fired heater equipped with an air inlet and air outlet, and duct means for conveying heated air from the heater outlet into the personnel compartment: the improvement comprising a heat exchanger located on the vehicle entirely outside the personnel compartment, said heat exchanger having external heat transfer surfaces exposed to the arctic atmosphere; said heat exchanger having internal air passage means of substantial length operatively connected between the personnel compartment and the heater air inlet; second duct means extending from the personnel compartment into communication with the heater air inlet, said second duct means constituting a bypass duct means around the heat exchanger passage means; selector valve means for alternately opening the second duct means and heat exchanger passage means; blower means for pumping air from the personnel compartment through the heat exchanger internal air passage means, or through the bypass duct means, and thence through the fuel-fired heater back to the personnel compartment; the heat exchanger having sufficient external heat transfer surface area exposed to the arctic atmosphere to condense water out of the air being pumped through the heat exchanger passage means; and condensate removal means at the downstream end of the heat exchanger passage means for preventing re-entainment of condensate into the air supplied to the heater; the size of the heat exchanger being such that heated air returned to the personnel compartment is sufficiently dry as to avoid significant fogging or icing on the interior surfaces of the windows.

2. The improvement of claim 1 wherein the second duct means is located within the heat exchanger passage means, the annular space between the outer surface of the second duct means and the inner surface of the heat exchanger constituting an air passage.

3. The improvement of claim 2 wherein the heat exchanger is arranged in a prone position beneath the fuel-fired heater, said heat exchanger comprising a horizontal tube having external fins thereon; said second duct means comprising a duct concentrically arranged within the horizontal tube.

* * * * *